(12) United States Patent
Hardwick

(10) Patent No.: US 8,449,800 B2
(45) Date of Patent: May 28, 2013

(54) METHOD OF STRENGTHENING THE CONNECTION BETWEEN PIPE SECTIONS IN HIGH PRESSURE PIPELINES

(76) Inventor: Howard Hardwick, Medford, NJ (US)

( * ) Notice: Subject to any disclaimer, the term of this patent is extended or adjusted under 35 U.S.C. 154(b) by 63 days.

(21) Appl. No.: 12/932,200

(22) Filed: Feb. 18, 2011

(65) Prior Publication Data

US 2012/0211916 A1    Aug. 23, 2012

(51) Int. Cl.
*B32B 3/26* (2006.01)

(52) U.S. Cl.
USPC ........... 264/135; 264/134; 264/165; 264/166; 264/171.12; 264/171.13; 264/171.26; 264/240; 264/241; 264/242; 264/248; 264/249; 264/254; 264/255; 264/259; 264/260; 264/261; 264/262; 264/263; 264/271.1; 264/272.13; 264/275; 264/277; 264/279; 264/279.1; 264/294; 264/510; 264/512; 264/515; 264/563; 264/632

(58) Field of Classification Search
USPC ................. 264/240, 242, 248, 249, 252, 256, 264/255, 254, 259, 260, 261, 262, 263, 271.1, 264/272.13, 275, 277, 279, 279.1, 632, 510, 264/512, 515, 563, 165, 166, 171.12, 171.13, 264/171.26, 134, 135, 241, 294
See application file for complete search history.

(56) References Cited

U.S. PATENT DOCUMENTS

| | | | | | |
|---|---|---|---|---|---|
| 2,173,399 | A | * | 9/1939 | Mills | 138/99 |
| 2,661,500 | A | * | 12/1953 | Seymour et al. | 264/135 |
| 3,938,774 | A | * | 2/1976 | Smith | 249/90 |
| 2008/0017263 | A1 | * | 1/2008 | Robinson et al. | 138/99 |

* cited by examiner

*Primary Examiner* — Jeffrey Wollschlager
*Assistant Examiner* — Stella Yi
(74) *Attorney, Agent, or Firm* — Stuart M. Goldstein

(57) ABSTRACT

A preventative maintenance method of strengthening the connection between high pressure, in situ piping. An encapsulation mold is installed over a properly functioning, non-leaking coupling or joint interconnecting pipe sections carrying gas in excess of 60 psi. A resin sealant having tensile strength in excess of 3000 psi fills the mold, so that it circumscribes the coupling and adjacent portions of the pipe sections extending from the coupling, forming a permanent bond to the coupling and pipe sections. The method prevents high pressure pipe connection pullout, which otherwise could lead to catastrophic failure.

10 Claims, 4 Drawing Sheets

METHOD OF STRENGTHENING THE CONNECTION BETWEEN PIPE SECTIONS IN HIGH PRESSURE PIPELINES

FIELD OF THE INVENTION

The present invention relates to a method of in situ preventative maintenance of industrial and commercial structures, such as pipes and pipe joints carrying gas under high pressure. More specifically, the present invention utilizes a method of strengthening the connection of pipe sections interconnected by pipe couplings.

BACKGROUND OF THE INVENTION

Underground steel pipelines carrying gas up to 300 psi are routinely joined together with bolted couplings that have internal rubber seals. These seals are pushed against the surface of the pipe sections as the bolts are tightened making the gas tight seal on each pipe section. It is imperative that such high pressure piping and their connectors be free of leaks. High pressure pipe leaks are particularly dangerous, often times leading to explosions resulting in extensive loss of property and even serious or fatal injuries to bystanders. However, over the years pipe sections can pull out of their bolted couplings through ground movement or third party damage. This will cause the very catastrophic leaks which must be avoided.

Most attempts to address gas leaks from pipes are reactive. That is, the problem of leakage is only first addressed when the leak itself is recognized. This is generally not a problem in repairing leakage from low pressure (e.g. up to 2 psi) or medium pressure (e.g. up to 60 psi) piping. These low and medium pressure leaks are often repaired by the encapsulation of the leaking joint or coupling. In the encapsulation process, the leaking joint is first grit blasted down to bare metal and a primer is applied. A mold is placed around the joint and a synthetic resin sealant of relatively low tensile strength, i.e. approximately 500 psi, is mixed and poured into the mold and then pressurized to above the gas pressure in the pipe. This method stops the leak, as the gas cannot move from a low pressure to a higher pressure. The resin sealant cures within the next hour to a solid rubber type material that is permanently bonded to the pipe, yet remains flexible. Flexibility of the joint is important, in this situation, because these pipes are generally made from twelve foot lengths of cast iron, which is not ductile and would break if they were not allowed to flex at the joints. Tests have shown that such encapsulation methods have successfully maintained sealed pipe joints for a minimum of fifty years.

However, there are relatively few methods which are available for high pressure steel piping leak prevention; that is, methods which address strengthening pipe sections at their couplings so as to prevent the pipe sections pulling out of the couplings, causing a catastrophic leak. Past preventative maintenance methods include replacement of standard bolted couplings by reinforcing restraint couplings. These are similar to bolted couplings, but have added integral gripping rings positioned at either side of their rubber seals. As the bolts are tightened, these gripping rings are pushed down the slope of the coupling barrel and dig into the pipe sections preventing the pipes from pulling out of the coupling. Replacing a standard bolted coupling with a restraint coupling on an existing pipeline is highly impractical and very expensive.

Where a pipeline can be turned off, the gas must be stopped at either side of the coupling by using a high pressure, multiple stopple system. Disposable stopple fittings, which are expensive, must first be welded to the pipe. A high pressure drill is attached to the fittings and multiple large holes are drilled into the pipe. The drill is removed and a stopple is inserted through each hole and deployed to stop the flow of gas. One or two stopples are placed on both sides of the coupling, with sufficient room between them to cut out the section of pipe containing the coupling. There is normally insufficient gap between the ends of the two original pipes to allow removal of the coupling or install the new one. As a result, this piping section must be cut out and replaced with a spool length of pipe and two restraint couplings. The stopples are removed and the stopple fittings are capped. While these expensive fittings must remain on the pipe, they still may be a future source of leakage. Where the pipeline must always be in service, which is usually the case, the above method is used with the addition of a full pressure by-pass being installed to re-route the gas, while the short section of main is out of service. Both of these methods of switching out the couplings require substantial excavations and a large crew with safety personnel standing by. This, of course, is very expensive, time consuming, and a disruption to the operation.

Another common method of high pressure leak prevention consists of welding a split sleeve fitting or "pumpkin" over the coupling. This is also an expensive proposition. Apart from the cost of the pumpkin, this device must be welded by a certified high pressure pipeline welder, a specialized individual whose service creates even more expense. Significantly, there are also major safety concerns with welding onto in-service pipelines. Burn through will occur if the unmelted area beneath the weld pool can no longer contain the pressure within the pipe or equipment. This will cause the contents of the pipe to escape and hit the molten metal with disastrous results.

Another concern is for the integrity of the pipeline following welding, since welds made in-service cool at an accelerated rate, as the result of the ability of the gas flowing through the pipe to remove heat from the pipe wall. The pipe itself is also a heat sink and the outside temperature and wind can have an additional cooling effect. The welds, therefore, are likely to have hard heat-effected zones and a resulting susceptibility to hydrogen cracking. In addition, the metallurgy of the pumpkin and the weld materials must be compatible with the metallurgy of the pipe. Special welding consideration may be needed for high tensile strength steels to avoid weld cracking and there may be a need for post-weld heat treatment.

It is quite evident that existing methods for addressing the potential for pullout of the pipe sections from the couplings of high pressure piping are expensive and afford a number of significant disadvantages and risks.

SUMMARY OF THE INVENTION

It is thus the object of the present invention to provide a preventative maintenance method of strengthening the connection between high pressure piping which is simple, practical, effective and relatively inexpensive.

The problems, disadvantages, and limitations associated with welding onto pipelines are avoided by the present invention, while still replicating the same or greater resulting strength between pipe joint connections as the restraint coupling, pumpkin, or similar means.

In accordance with the present invention, a standard pipe coupling connecting high pressure pipe sections is encapsulated with an extremely high strength polyurethane resin sealant in a non-pressurized mold. A non-pressurized mold is used since the method is employed on in situ piping which is not leaking, even though it is carrying gas up to or in excess of 300 psi. Since there is no pipe leakage, there is no pressure to overcome in the encapsulation process. Nonetheless, the mold allows for a sufficient thickness of resin sealant to provide the required strength to maintain the coupling. It has been found that at least one inch of thickness over every part of the coupling and over at least two inches of adjacent pipe length extending either side of the coupling is optimally required. The resin sealant used in the mold has a tensile strength in excess of 3000 psi. When it is hardened, the resin sealant adheres to both the coupling and adjacent surfaces of the pipe sections. It forms a solid material which has the necessary rigidity to maintain the connection. The result is a mold containing rigid material which spans two ends of pipe sections and the intermediate coupling. It constitutes a bridge which effectively holds and maintains the two ends of the pipe in the same position relative to each other. This rigid connection ensures that the pipe sections cannot pull out of the coupling. The potential for leakage at the coupling is thereby eliminated.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

The method of the present invention is directed towards preventative maintenance of pipe couplings, in order to eliminate future pipe pullout from the couplings. It is to be used to maintain pipe sections, interconnected by pipe couplings, which carry gas with pressures over 60 psi to in excess of 300 psi. It is contemplated that the method can be utilized in conjunction with most common pipe couplings, including the Smith-Blair® standard couplings for steel pipe or Dresser® Style 38 couplings. However, the invention is not deemed to be restricted by the type or manufacturer of the pipe coupling which is used.

The method of the present invention is specifically directed towards strengthening the connections between the high pressure piping, by means of a unique pipe section/pipe coupling encapsulation method. The method is not utilized in low pressure situations where a pipe coupling or other pipe joint is currently leaking.

Figure 1:
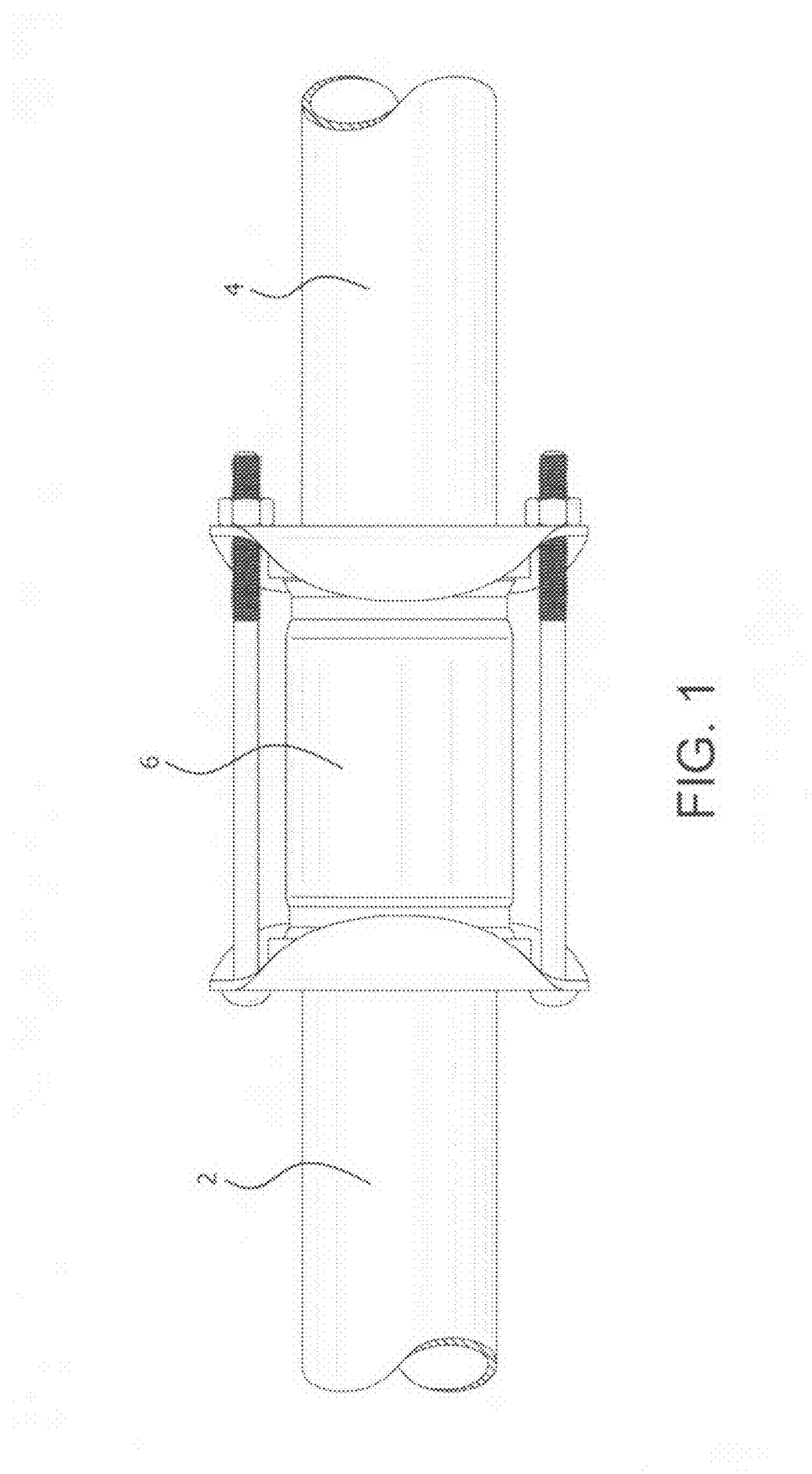
FIG. 1 is an elevation view showing two pipe sections interconnected by a standard pipe coupling.

FIG. 1 shows a typical joinder of pipe sections 2 and 4, employing generic interconnecting pipe coupling 6. Pipe sections 2 and 4 are inserted into pipe coupling 6 with minimal space 8, e.g. less than one inch, therebetween. See FIG. 2. During normal flow of high pressure gas through pipe coupling 6, there is no problem with gas traveling through pipe sections 2 and 4 of the pipeline. Properly placed and secured couplings will operate satisfactorily. However, too often incidents occur where pipe sections in such joints pull out of the coupling, due to deterioration, equipment trauma, ground movement, third party damage, or other circumstances, causing such connections to fail. A dangerous, high pressure incident is the likely result. The method of the present invention provides an additional safety factor in the interconnection of these high pressure pipe sections, which addresses this problem before it can occur.

Figure 2:
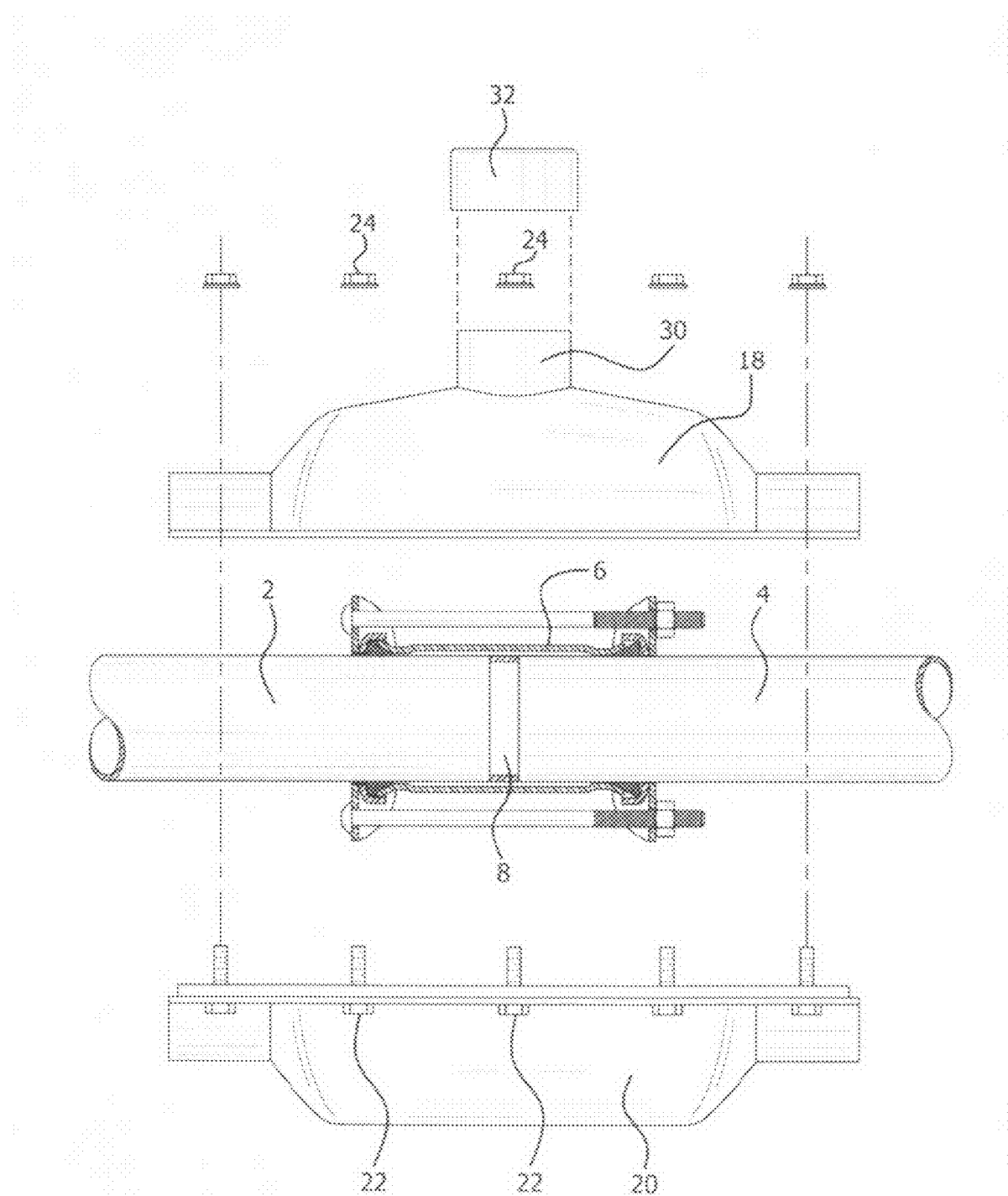
FIG. 2 shows the encapsulation of the pipe joint and pipe sections with a thermosoftening plastic mold, an initial step of the method of the present invention.
Figure 3:
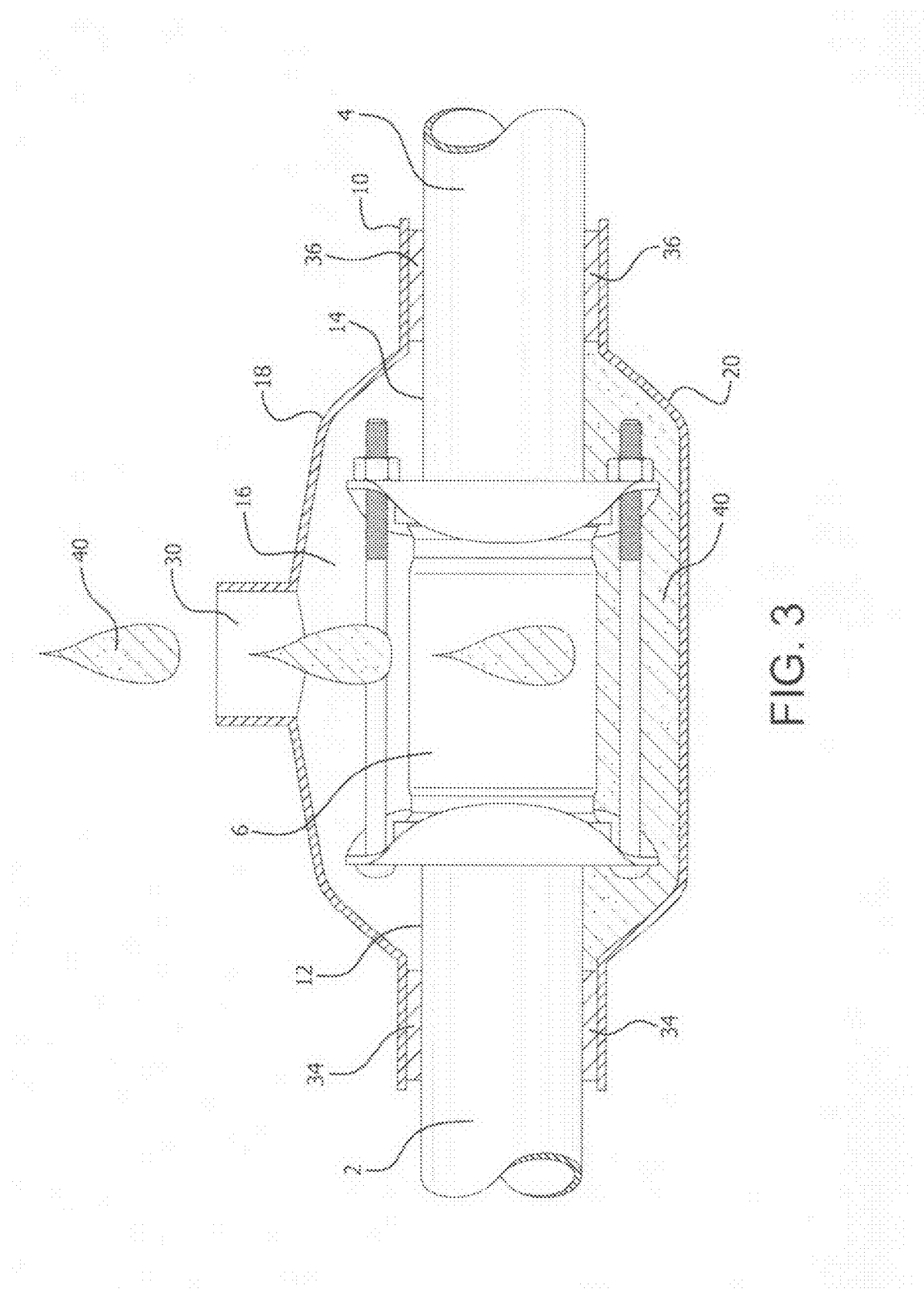
FIG. 3 depicts, in partial cross-section showing the interior of the mold, the next step of the method of the present invention, in which a high tensile strength polyurethane resin sealant is poured into the mold.

The subject method first comprises inspecting the piping connection to ensure that there is no leakage and therefore zero pressure, coming from coupling 6 or pipe sections 2 and 4. The coupling and pipe sections a few inches either side of the coupling are then grit blasted down to bare metal and primed with a specially formulated primer suitable for the high tensile resin sealant to be used. As seen in FIGS. 2 and 3, encapsulation mold 10, having internal space 16 extending substantially the length and width of the mold, is then installed over coupling 6 and over external adjacent portions 12 and 14 of pipe sections 2 and 4. Mold 10 also comprises pipe cushioning foam padding to prevent resin sealant leakage at points 34 and 36, and open intake port 30 with removeable cap 32.

Encapsulation mold 10 is a non-pressurized mold. That is, since there is no leakage/pressure coming from coupling 6 or pipe sections 2 and 4, mold 10 can be installed easily, by simply placing it around the coupling and the pipe sections. Mold 10 is quickly and effectively secured over coupling 6 and pipe sections 2 and 4 by simply aligning top half 18 and bottom half 20 of the mold over the coupling and the pipe sections and securing the halves tightly in place by means of bolts 22 and nuts 24. Mold 10 should extend approximately two inches over adjacent portions 12 and 14 of pipe sections 2 and 4.

Mold 10, as shown in the FIGS. is a thermosoftening plastic encapsulation mold. However, given that there is no pressure between the mold and coupling 6 and pipe sections 2 and 4, molds can be fabricated from any compatible metal, thermocuring plastic, thermosoftening plastic, or fabric material, etc. However, it is critical that the mold have an internal space 16 of sufficient dimension to accept the proper thickness of the polyurethane resin sealant which will be poured into the mold. It is contemplated that at least one inch of space and ultimate thickness of the resin sealant is required over both the surface of the coupling and over at least two inches of the surfaces of adjacent portions 12 and 14 of pipe sections 2 and 4.

As seen in FIG. 3, polyurethane based resin sealant 40, which initially is in liquid form, is poured through intake port 30 of mold 10, such that the resin sealant fills the entire internal space 16 of the mold. Resin sealant 40 is a unique polyurethane type resin having a tensile strength in excess of 3000 psi. Such a high tensile strength encapsulation resin has heretofore never been used for gas leak prevention. Resin sealant 40, when solidified, has the extreme advantage, not previously known, in that it provides the strength to withstand potential high pressure leakages which will occur if a pipe section pulls out of its pipe couplings. It also remains in a liquid state for sufficient time to complete the mold filling process and then cures, within an hour, to a solid state.

Once poured into internal space 16, resin sealant 40 circumscribes not only coupling 6, but also adjacent portions 12 and 14 of each pipe section 2 and 4, forming a permanent bond to the pipe sections, as the resin sealant adheres to the surfaces of these adjacent portions.

Figure 4:
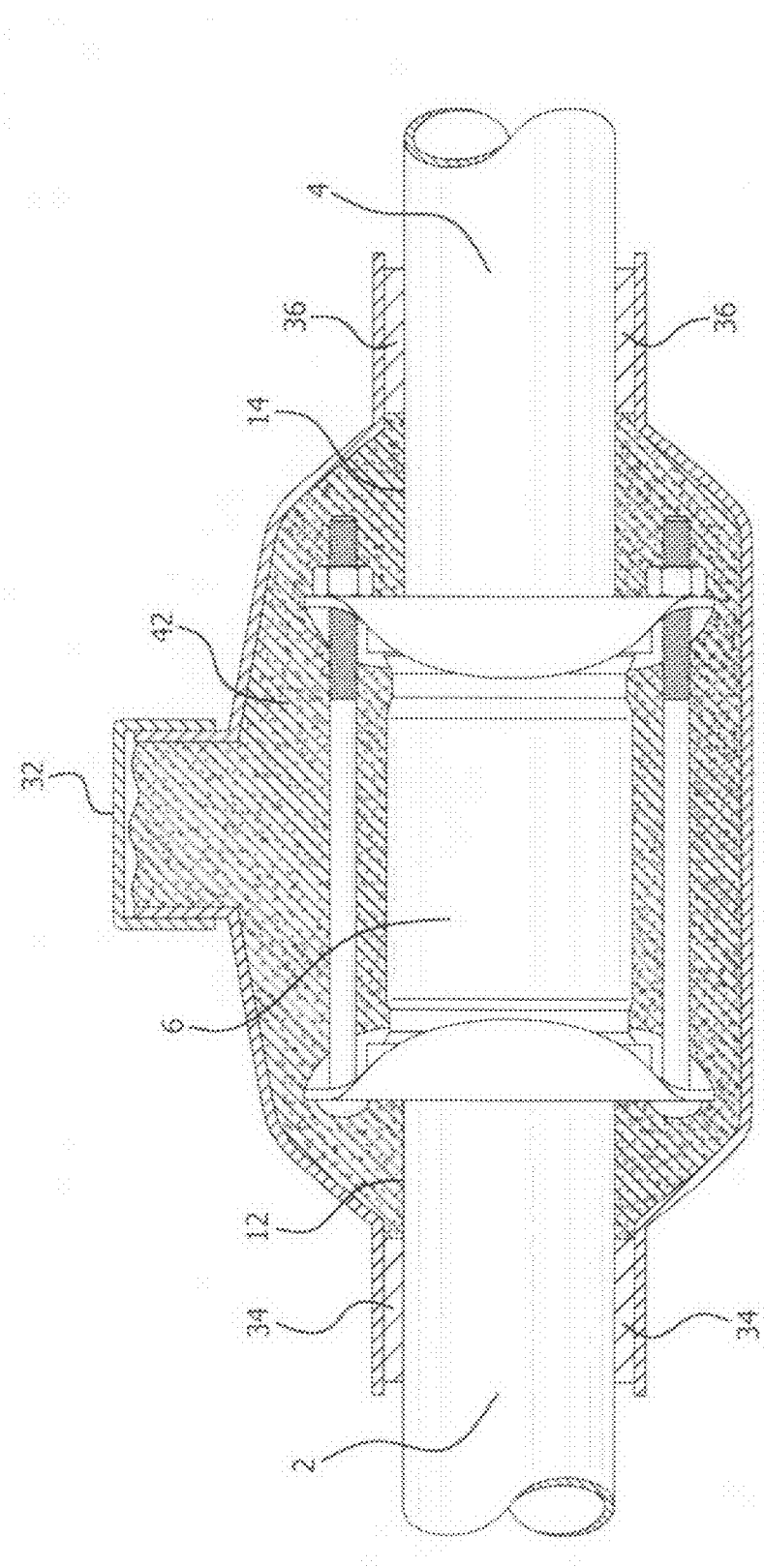
FIG. 4 is a partial cross-section of the interior of the mold, showing the pipe sections interconnected by the coupling and rigidly encapsulated by the method of the present invention.

FIG. 4 shows the final result of the method of the present invention. Specifically, resin sealant 40 has cured and solidified within internal space 16 of mold 10, forming a solid, rigid resin sealant core 42 around the coupling and pipe sections. The mold and its resultant rigid resin sealant effectively spans pipe sections 2 and 4 with a solid bridge which permanently secures the two pipe sections in the same position relative to each other, thus ensuring that the pipe sections cannot pull out of coupling 6.

Resin sealant 40, unique to encapsulation techniques, forms the core which provides the necessary rigidity to the piping joint. In testing, resin sealant 40 has been found to have six times the tensile strength of PLCS Series 6 polyurethane resin, a resin composite commonly used as a sealant in a myriad of successful, low and medium pressure gas leakage encapsulation procedures. However, the use of sealant 40 in the subject method is a key and unique factor in simply, effectively, and safely maintaining the integrity of high pressure piping connections. The method prevents leakage and the subsequent catastrophic failure of high pressure pipe joints and couplings, by utilizing the enhanced strength resin sealant to successfully accomplish preventative maintenance of these connections.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. The method for strengthening non-leaking connections between high pressure in situ piping, the steps of the method comprising:
    providing two separate sections of open ended, in situ piping carrying gas with a pressure in excess of 60 psi, said sections being interconnected by a pipe coupling between the open ends of the pipe sections;
    ensuring there is no leakage of gas and zero pressure coming from the pipe coupling or the pipe sections as the gas is being carried through the piping at a pressure in excess of 60 psi;
    grit blasting the coupling and portions of each pipe section which extend from and are adjacent to the coupling;
    applying a primer to the grit blasted coupling and adjacent portions of the pipe sections;
    providing a non-pressurized encapsulation mold having an internal space extending the length and width of the mold;
    installing the non-pressurized encapsulation mold over the coupling and pipe sections such that the mold completely encapsulates the coupling and covers the adjacent portions of each pipe section;
    securing the encapsulation mold over the encapsulated coupling and pipe sections;
    providing a curable, liquid polyurethane resin sealant having a tensile strength in excess of 3000 psi;
    pouring the resin sealant into the non-pressurized encapsulation mold, directly onto the outer surfaces of the adjacent portions of each pipe section;
    filling the entire space of the non-pressurized encapsulation mold between the inner surface of the non pressurized mold and the outer surfaces of the adjacent portions of the pipe sections, with, the resin sealant such that the resin sealant is the sole bonding and strengthening constituent contained within the space of the encapsulation mold;
    allowing the resin sealant to adhere directly to the outer surfaces of the adjacent portions of the pipe sections and cure and solidify within the internal space of the mold between the inner surface of the mold and the outer surfaces of the adjacent portions of the pipe sections, such that the resin sealant is the, sole bonding and strengthening constituent adhered to the outer surfaces;
    forming a rigid, resin sealant pipe containing core comprising only the resin sealant around the coupling and directly on the outer surfaces of the adjacent portions of the pipe sections; and
    retaining the encapsulation mold over the coupling and pipe sections; thereby
    providing a high tensile strength encapsulation over the connection between the pipe sections utilizing the resin sealant as the sole bonding and strengthening constituent within the encapsulation mold.

2. The method as in claim 1 wherein the pipe sections carry gas pressures of 300 psi and greater.

3. The method as in claim 1 wherein the mold comprises a fabric material.

4. The method as in claim 1 wherein the mold comprises a metal material.

5. The method as in claim 1 wherein the mold comprises a thermosoftening plastic material.

6. The method as in claim 1 wherein the mold comprises a thermocuring plastic material.

7. The method as in claim I wherein the thickness of the resin sealant is at least one inch over the surface of the coupling and at least one inch over at least two inches of the adjacent portions of the pipe sections.

8. The method as in claim 1 comprising the further step of curing the poured resin sealant to a solid state within one hour.

9. The method as in claim 1 comprising the further step of allowing the poured resin sealant to cure to a natural solid state, unaffected by any external factors.

10. The method as in claim 8 comprising the further step of allowing the poured resin sealant to cure to a natural solid state, unaffected by any external factors.

* * * * *